Sept. 17, 1968    H. K. BURKE ET AL    3,402,289
AUTOMATIC CONTROL SYSTEM FOR VEHICLES INCORPORATING A
RANGING SYSTEM FOR VEHICLE TRAFFIC SAFETY CONTROL
Filed Dec. 29, 1966    2 Sheets-Sheet 1
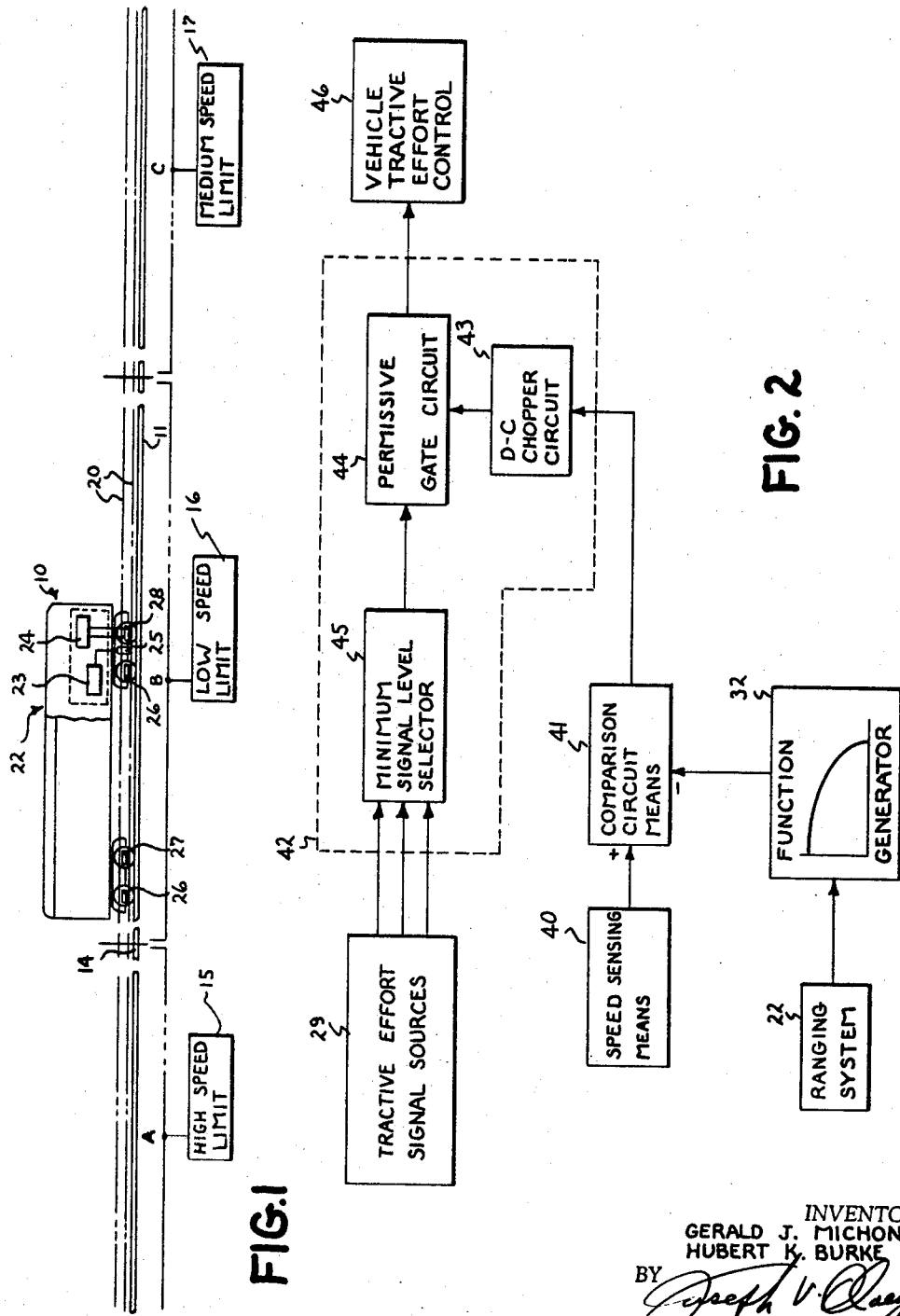
INVENTORS
GERALD J. MICHON
HUBERT K. BURKE
THEIR ATTORNEY

INVENTORS
GERALD J. MICHON
HUBERT K. BURKE
BY
THEIR ATTORNEY

United States Patent Office 3,402,289
Patented Sept. 17, 1968

3,402,289
AUTOMATIC CONTROL SYSTEM FOR VEHICLES INCORPORATING A RANGING SYSTEM FOR VEHICLE TRAFFIC SAFETY CONTROL
Hubert K. Burke, Schenectady, and Gerald J. Michon, Waterford, N.Y., assignors to General Electric Company, a corporation of New York
Filed Dec. 29, 1966, Ser. No. 605,913
8 Claims. (Cl. 246—167)

This invention relates to automatic control systems for vehicles of the type wherein the vehicle is controlled in accordance with electrical signals and, more particularly, to such systems wherein traffic safety is controlled in accordance with electrical signals from a ranging system. Although not limited thereto, the present invention is especially suited for automatically controlling the operation of vehicles following a fixed route, such as railway vehicles, and will be particularly described in that connection.

In railway systems; such as rapid transit systems and the like, for example, the vehicles must be operated in compliance with various local speed limits as well as in compliance with the particular traffic conditions existing in advance of the vehicle. In the existing railway signaling systems, the block system is employed and the condition of traffic in advance is indicated in terms of the particular block in which the vehicle ahead is located. While various arrangements may be employed depending upon track density and speeds, the typical block system may be arranged to indicate whether the first block in advance, the second block in advance or neither of such blocks is occupied. In such a three-level block system, for example, the block immediately behind the occupied block would be assigned the red or stop indication; the next following block, the yellow or approach with caution indication; and the third block behind the occupied block would be assigned the green or clear indication which would permit vehicle operation at maximum speed consistent with the local track speed limit. In such a system, therefore, it is apparent that the length of each block is determined by the running speeds permitted and the braking capacity of the vehicles being operated. Thus, the red block must be long enough to permit stopping from yellow speed and the yellow block must be long enough to permit vehicle retardation from the green to the yellow speed.

Known train control and cab signaling systems employ the block signaling system and vehicles may be provided with apparatus responsive to coded track currents to provide a visual indication of maximum permissible speed corresponding to the local track speed limit and the existing condition of traffic in advance. Apparatus may also be provided to effect an automatic application of brakes if the vehicle enters a track section indicating a more restrictive signal aspect than the preceding track section unless the operator within a predetermined time interval manually applies the brakes to slow or stop the vehicle.

With the increasing demands being placed on railway systems, especially urban rapid transit systems, there has been a growing need to provide the fully automatic operation of vehicles. That is, operation of vehicles wherein no engine man or other operating personnel are required for vehicle operation and where control of both propulsion and braking is achieved in accordance with received electrical command signals from wayside. Such an automatic vehicle control system is described and claimed in the copending application of Allen and Lichtenfels entitled, "Automatic Control System for Vehicles," Ser. No. 418,132 filed Dec. 4, 1964 now Patent No. 3,334,224, and assigned to the same assignee as the present invention. As described in that application, the wayside command signals may be provided by any suitable signaling or communication system such as, for example, the existing block railway signaling systems.

It has been recognized in the art that the block system possessed certain inherent limitations which limit track capacity in the railway systems wherein such factors as maximum track usage, vehicle speed, vehicle spacing, vehicle headway (time spacing) and safety are so very important. For example, in the block system, fixed block lengths are required with considerable interblock wiring and, since vehicle presence is expressed in terms of the block in which the vehicle in advance is located, uncertainty exists to an extent dependent upon the block length as to the exact distance of each vehicle in advance. Although track usage can be increased in such systems by employing more and shorter block lengths providing a higher level system, such systems become extermely expensive due to the multiplication of equipment and to the considerable interblock wiring which is required. Moreover, blocks shorter than the train length offer no advantage except at known stop points such as stations since the train ahead would always bridge two track sections and show occupancy in both blocks.

In view of the problems presented by the inherent limitations of the block system, attempts were made in the prior art to provide systems which would be capable of more precisely indicating the distance between the vehicle and an obstruction in advance. One such arrangement is disclosed in U.S. Patent No. 2,702,342 to Korman. An improved system of this general type is described and claimed in the copending application of Bolster et al., entitled, "Ranging Systems," Ser. No. 297,789 filed July 26, 1933, now Patent No. 3,305,682, and assigned to the same assignee as the present invention. In the system of application Ser. No. 297,789, a range signal is continuously derived from transmitted and reflected wave energy in a transmission line which extends along the route of travel of the vehicle. The signal so derived increases in value as a function of increasing distance between the vehicle and a vehicle in advance thereof. Since the system of that application is so especially suited for measuring the distance between a vehicle and another vehicle in advance, the present invention will be particularly described in connection with such a ranging system. It is to be understood, however, that the ranging system of Patent No. 2,702,342 or any other suitable ranging system may be utilized in the present invention.

While the inherent limitations of the block system present serious problems in the operation of any rapid transit system, such problems become more and more intolerable in high performance automatically operated systems wherein, in order to realize the full potential thereof, vehicles must be permitted to be operated at high speed and close spacing with absolute safety.

In the application of Bruce A. Wells, Ser. No. 518,171, filed Jan. 3, 1966, there is disclosed and claimed a new and improved arrangement incorporating a range signal, from a suitable ranging system, into a system for automatically controlling the operation of vehicles so that safe operation of the vehicles is provided in accordance with wayside electrical signals representing only the local track speed limit.

The system of the present invention, while it may be said to embody the broad principle of operation set forth in the above-identified Wells invention, differs therefrom in various particulars including, for example, the arrangement for implementing the range signal and producing therefrom an allowable tractive effort signal for use as an override limit. The present system provides two functions in an inherently more "fail-safe" manner than any other system of which we are aware. These functions are: separation of vehicles wherein the speed of the vehicle is controlled to prevent overtaking and colliding with a vehicle in advance; and safety stopping wherein the vehicle is automatically brought to a stop a safe distance behind a fixed obstruction in advance thereof.

It is a primary object of this invention, therefore, to provide a new and improved arrangement for controlling the operation of a vehicle in response to received electrical signals representing vehicle operating data, such as maximum local speed limits and a signal representing the distance between the vehicle and an obstruction in advance thereof, which has an inherently more "fail-safe" and reliable mode of operation than other known arrangements.

Briefly stated, in accordance with one aspect of this invention, a new and improved system is provided for controlling the operation of vehicles in accordance with tractive effort control signals representing the most restrictive mode of operation called for by (1) a number of first electrical signals derived from electrical quantities representing vehicle operating data such as prescribed maximum local speed limits, and (2) a second electrical signal representing the distance from the vehicle to an obstruction in advance thereof. In accomplishing the foregoing, means are provided for comparing an electrical signal proportional to the actual vehicle velocity and an electrical signal, produced in response to the second electrical signal, which is proportional to a maximum vehicle velocity for a given range to provide a velocity error signal whose amplitude and polarity vary as a function of the difference in magnitude between the two signals being compared. There is also provided a circuit means for converting a preselected polarity of this velocity error signal to an alternating current signal whose amplitude is determined by the magnitude of the velocity error signal. A minimum quantity selector means is provided for producing a unidirectional voltage output signal representing the smallest of all of the first electrical signals present at its input. The alternating current signal and the unidirectional output signal from the minimum quantity selector means are applied to first and second input means, respectively, of a gate circuit means which is operative to produce an alternating current output signal whose amplitude is determined by the lesser amplitude of the signals applied at such first and second input means. This alternating current signal may then be utilized in any convenient manner to control the propulsion or braking effort applied to the vehicle. For example, it may be utilized as an A-C control signal or suitably rectified and utilized as a direct current control signal.

The novel features believed characteristic of the invention are pointed out with particularity in the appended claims. The invention itself, however, both as to its organization and method of operation, as well as, further objects and advantages thereof, may best be understood by reference to the following description taken in conjunction with the accompanying drawings in which:

FIGURE 1 is a diagrammatic representation of a railway system equipped with apparatus provided in accordance with this invention;

FIGURE 2 is a block diagram of the system of this invention; and

Figure 3:
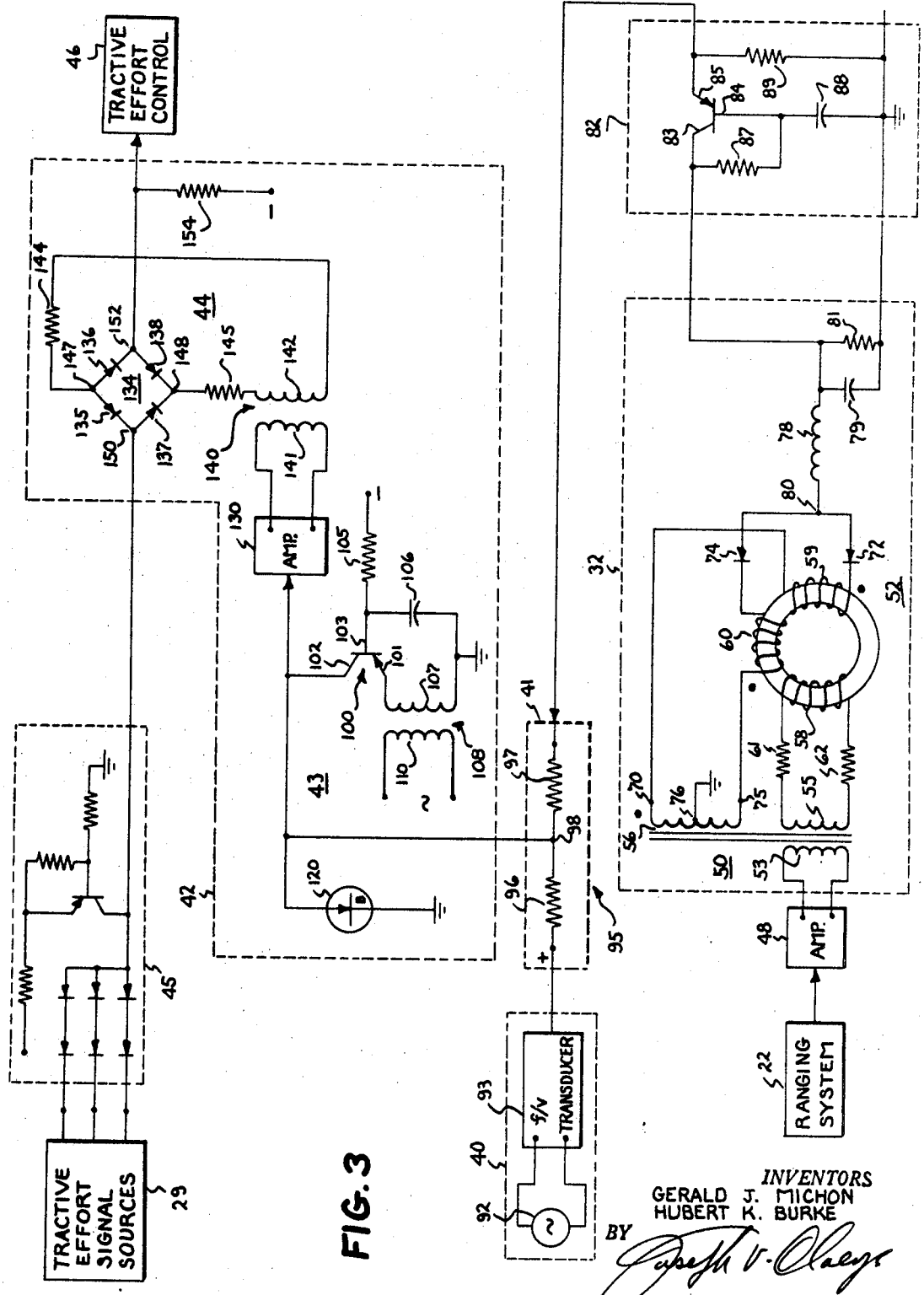
FIGURE 3 is a schematic circuit diagram showing circuit details of one embodiment of the present invention.

Referring now to the drawings, in FIGURE 1 there is shown a vehicle 10 which follows the fixed route provided by the track 11. The operation of vehicle 10 is arranged to be controlled automatically in accordance with local track conditions, as represented by wayside electrical speed limit signals, and the condition of traffic in advance, as represented by an electrical range signal derived on board the vehicle, the value of which range signal increases as a function of increasing distance between vehicle 10 and an obstruction, such as another vehicle, in advance.

The various wayside speed limit signals for the different track regions are arranged to be transmitted throughout discrete communication zones corresponding to such regions. Any suitable communication or signaling system may be employed, such as for example, an inductive carrier system wherein the discrete communication zones are provided by separate wayside inductive loops. Alternatively, the discrete communication zones may be provided by separate track circuit sections if a conventional coded track circuit type of signaling system is employed.

For simplicity of explanation, track 11 in FIGURE 1 is shown divided into zones A, B and C by the dividers 14. Dividers 14 are intended to represent schematically that suitable means are provided for defining the limits of each zone. Such dividers do not necessarily physically divide the track rails although such actual physical division may be provided when the conventional insulated joint track circuit type signaling system is utilized. On the other hand, when continuously conductive track rails are employed, the limit of the zones may be provided in any suitable manner such as by low impedance crossbonds, turned circuits or the like.

Although in any particular railway system various factors determine the maximum speed limit to be assigned to the different regions along the route, for purposes of explanation, zone A is shown as being assigned a high speed limit, zone B a low speed limit and zone C a medium speed limit which may, for example, correspond to 70, 30 and 50 miles per hour. Electrical signals representing these different speed limits are illustrated as being supplied to the communication zones associated with such track regions by the transmitters 15, 16 and 17 respectively. The condition of traffic in advance of the vehicle determines whether or not the vehicle may travel safely at the maximum allowable speed assigned a given zone. In the system of the present invention the condition of traffic in advance is represented by an electrical range signal derived on board the vehicle and which range signal increases in value as a function of increasing distance between the vehicle 10 and an obstruction in advance.

Preferably, the range signal is provided by a ranging system of the type disclosed and claimed in the foregoing referenced application of Bolster et al., Ser. No. 297,789 the disclosure of which is intended to be incorporated herein by reference. Accordingly, a transmission line 20 provided which extends along the track 11. As described in detail in such copending application, the ranging system, generally designated at 22 in FIGURE 1, includes a transmitter 23 and a receiver 24. Transmitter 23 is provided with an energy coupling device 25 for supplying energy to the line 20. To assure propagation of wave energy in transmission line 20 in one direction only, the ranging system includes energy reflecting devices 26 and an energy absorbing device 27 which devices are also carried by vehicle 10. The input of receiver 24 is connected to a signal extracting means 28. Signal extracting means 28 extracts a first signal from the transmitted energy in line 20 and a second signal from the reflected energy therein. These two signals extracted from transmission line 20 are then suitably phase compared to produce a signal which continuously provides a measurement of the distance between vehicle 10 and a vehicle in advance, as described in more detail in the copending application.

The broad concept of the present invention can be described briefly in connection with the elementary diagram of FIGURE 2. As shown, the range signal from a suitable ranging system, such as 22, is applied to the input of a function generator 32 which is operative to generate a permissible vehicle velocity signal corresponding to the range. That is, for a given range the vehicle must not exceed a specified velocity so that function generator 32 generates a suitable range distance—velocity trajectory. The actual parameters of function generator 32 for any specific application will be determined by both the required stopping trajectory and the system dynamics. In the arrangement shown, the output of function generator 32 is a D-C voltage signal whose magnitude is proportional to the minimum vehicle velocity that would result in full braking effort for the range. Thus, the vehicle could have any actual velocity under that indicated by the output curve of the function generator 32, at a given range, but would be in a decreasing level of braking as the actual velocity selected is reduced. By the time the actual vehicle velocity is some predetermined velocity less than the reference, full positive traction can be applied to the vehicle. In practice the system has been arranged, for example, to provide that the actual vehicle velocity be less than the reference curve by an amount (depending on the gain) which will provide for a braking rate equal to the scope of the reference at that range.

A D-C voltage signal whose magnitude is proportional to the actual velocity of the vehicle is also produced and this signal is compared with the permissible vehicle velocity signal to provide a velocity error signal. To this end, a speed sensing means 40 is provided for producing a unidirectional voltage signal whose magnitude is proportional to the actual velocity of the vehicle. The permissible vehicle velocity signal from function generator 32 and the actual vehicle velocity signal from speed sensing means 40 are applied to a suitable comparison circuit means 41, the output of which is proportional to the velocity error. Conveniently, comparison circuit means 41 may be a simple summing resistance as shown in more detail in FIGURE 3.

The velocity error signal from comparison circuit means 41 is arranged to be of one polarity when the permissible velocity is of greater magnitude than the actual velocity and of the opposite polarity when the actual velocity is greater than the permissible velocity. For example, in the arrangement selected for illustration, the error signal is negative when the permissible velocity is greater than the actual velocity. This is conveniently accomplished by making the actual vehicle velocity signal positive and the permissible vehicle velocity signal from function generator 32 negative as indicated.

A suitable circuit means, generally designated at 42, is provided for producing a control signal from the direct current velocity error signal from comparison circuit means 41 and a number of direct current tractive effort command signals. The different tractive effort command signals may represent, for example, output signals from the speed control circuits, the positioned stop control circuits and one or more back-up or other control circuits of an automatic vehicle control system such as, for example, the system described in the foregoing Allen and Lichtenfels application Ser. No. 418,132.

Preferably, circuit means 42 is of the type disclosed and claimed in the copending patent application of Gerald J. Michon, Ser. No. 619,672 filed Mar. 1, 1967 which is operative to produce, from a number of direct current signals, a control signal whose maximum magnitude can never exceed a level determined by a preselected one of such direct current signals. Accordingly, the negative direct current error signal from comparison circuit means 41 is converted to an A-C signal of a preselected frequency having an amplitude which is proportional to the magnitude of the error signal. To this end, the error signal from comparison circuit means 41 is applied to a D-C chopper circuit 43 which is arranged to chop only the negative signals thereby giving zero output for a positive polarity error signal. The A-C velocity error signal so produced is applied as one input to a permissive gate circuit means 44.

The other input to permissive gate circuit means 44 is applied from the output of a minimum signal selector 45 having applied at its input a number of direct current tractive effort command signals. For the particular arrangement selected for illustration all of the direct current tractive effort command signals are of negative polarity with the lowest magnitude signal designating the most restricted operating condition.

Permissive gate circuit means 44 is operative to combine the direct current tractive effort command signal from minimum signal level selector 45 and the A-C signal from D-C chopper circuit 43 and deliver an A-C output as a control signal having an amplitude equal to the lesser amplitude of the two input signals thereto. This A-C control signal from circuit means 42 may then be utilized in any suitable manner with a tractive effort control 46 to control the propulsion or braking effort to be applied to the vehicle. From the foregoing it can be seen that the A-C signal from D-C chopper circuit 43 functions to provide an override limit on the otherwise controlling direct current tractive effort command signal applied to the other input of gate circuit 44.

An embodiment of the present invention is illustrated in more detail in FIGURE 3. Different specific apparatus units included in FIGURE 3 are not part of the present invention but have been illustrated to facilitate a more complete understanding of the invention in an operating environment. Also, these different apparatus units, the details of which it is unnecessary to consider in the present application, have been represented by blocks. Accordingly, block 22 represents a suitable ranging system which for the embodiment illustrated may be of the type disclosed in the copending Bolster et al. application, Ser. No. 297,789. Similarly, the blocks 29, 40 and 46 represent a suitable source of tractive effort command signals, speed sensing means and vehicle traction control mean, respectively, all of which may be of the type disclosed in the copending application of Allen and Lichtenfels, Ser. No. 418,132, for example.

As shown in FIGURE 3, therefore, the output of ranging system 22 is suitably amplified by amplifier 48 and utilized to drive the range function generator 32. In the embodiment illustrated, where the ranging system 32 is of the type described in the Bolster et al. application, the range signal is an amplitude modulated 8 kilocycle signal in which the amplitude is directly proportional to range for ranges between zero and about 3000 feet. Beyond about 3000 feet the only requirement is that the range signal exist and be equal to or greater than the value at 3000 feet. Although amplifier 48 is shown as a separate block it would ordinarily be physically located with or very near the ranging system apparatus to minimize noise problems in the low signal level circuits.

The stopping trajectory requirements are dictated by the expected track adhesion characteristics of the vehicle modified by an appropriate safety factor. Also, as stated previously, for any given range the vehicle velocity may not exceed a specified value. To produce this result in accordance with the present invention, a control trajectory function is generated by function generator 32.

Preferably, function generator 32 is of the type disclosed and claimed in application Ser. No. 605,742 filed Dec. 29, 1966 and assigned to the same assignee as the present invention. The function generator of that application produces a two-chord approximation of the specified velocity-range trajectory for the particular application and in a "fail-safe" manner by utilizing passive circuitry for maximum safety and reliability. As described in detail in that application, this is accomplished by applying the alternating current signal from the ranging system to the input windings of a linear transformer and a saturable core transformer and summing, rectifying and extracting the average value of the voltages produced at the output windings of both the linear transformer and the saturable core transformer.

Accordingly, as illustrated in FIGURE 3, function generator 32 includes a step-up linear transformer 50 and a step-up saturable core transformer 52. Linear transformer 50 has a primary winding 53 and secondary windings 55 and 56. Saturable core transformer 52 has a primary winding 58 and secondary windings 59 and 60. The primary winding 58 of saturable core transformer 52 is connected in series circuit with the secondary winding 55 of linear transformer 50.

To assure fail-safe operation, secondary winding 55 is preferably wound of resistance wire and this is illustrated schematically by the resistances 61 and 62. By making secondary winding 55 of resistance wire any failure in the form of shorted primary turns on saturable core transformer 62 causes loading of the resistance wire secondary winding 55 which results in a lower output voltage; a lower output voltage indicates a smaller distance between vehicles which is in the fail-safe direction.

One terminal 70 of linear transformer secondary winding 56 is connected through saturable core transformer secondary winding 59, back-to-back connected diode devices 72 and 74 and saturable core transformer secondary winding 60 to the other terminal 75; the center tap 76 of winding 56 being returned to a point of common reference potential, shown as ground. A suitable filter circuit is provided, including the series combination of inductance 78 and capacitance 79, connected between the junction 80 between diode devices 72 and 74 and ground. The output of function generator 32 is developed across resistance 81 in the form of a D-C voltage signal.

In operation, the amplified range signal is applied to primary winding 53 of linear transformer 50 and through secondary winding 55 to the primary winding 58 of saturable core transformer 52. The output of linear transformer 50 and saturable core transformer 52 are summed, rectified by diode devices 72 and 74 and the average value extracted by the L-C filter circuit to provide the direct current two-chord velocity-range function.

From the foregoing description of function generator 32, it will be apparent that its mode of operation is inherently fail-safe. For example, any open circuit or short circuit condition operates to reduce the output signal, and hence the permissible vehicle velocity signal at any range. Since transformers 50 and 52 are step-up, any primary-to-secondary short circuits cause a reduction in the A-C signal. Shorted primary turns on the linear transformer 50 cause loading of the driving source and thereby a lower output voltage. Further, as already described, shorted primary turns on saturable core transformer 52 cause loading of the resistance-wire wound secondary of the linear transformer 50 which also results in a lower output voltage.

Ranging system 22, being of the type employing guided electromagnetic energy, may produce a range-distance signal having an inherent perturbation which is a function of range and independent of time. In a particular system, for example, this standing wave function exhibited a period equivalent to about 16 feet. At high closing rates, the frequency of this perturbation would be sufficiently high that it is beyond the bandpass of the control system. At low closing rates, however, especially near the stopping point for a safety stop, the control system tends to follow the perturbations with resulting oscillations in the applied tractive effort. To minimize these ocillations, the output of function generator 32 may be applied to a peak detecting filter 82 the output of which follows the minimum velocity peaks of the perturbations introduced by the range signal.

To this end, peak detecting filter 82 is arranged to have a long charging time constant and a short discharging time constant. As shown, filter 82 includes a transistor device having a collector electrode 83, a base electrode 84 and an emitter electrode 85. A resistance 87 is connected between collector electrode 83 and base electrode 84 which is in turn connected through a capictance 88 to ground. A load resistance 89 is connected from emitter electrode 85 to ground.

The peak detecting filter arrangement just described is designed for operation with negative signals so that, in operation, when the input voltage applied at collector electrode 83 from function generator 32 is increasing in the negative direction, the base voltage of the transistor device increases in accordance with the R-C time constant provided by resistance 87 and capacitance 88. Under such conditions, the transistor device operates as an emitter-follower so that the output voltage follows the base voltage. When the input voltage is decreasing in the negative direction, the transistor device saturates and the discharge time constant is determined by the load resistance 89 and capacitance 88. Various charge-discharge time constants may be readily provided, therefore, by suitable selection of capacitance 88 and resistances 87 and 89.

The system also includes a speed sensing means 40 for producing a signal whose magnitude is proportional to the actual speed of the vehicle. Since it is desirable to obtain the most secure speed signals possible, speed sensing means 40 is preferably of the type disclosed in U.S. Patent No. 3,210,630, Zelina. The arrangement described in that patent employs an alternator 92 and a saturating core frequency-to-voltage transducer 93 to provide a unidirectional voltage signal whose magnitude is proportional to the actual vehicle velocity. Although not illustrated, it will be understood that alternator 92 is arranged to be suitably driven, such as by a vehicle axle, for example, to provide the foregoing described signal.

The D-C voltage signal from speed sending means 40 representing the actual vehicle velocity, is compared with the D-C voltage signal from the output of peak detecting filter 82, representing the permissible vehicle velocity for that range, to provide a velocity error signal. As shown, the output of frequency sensing means 40 is arranged to have a positive polarity and the output of peak detecting filter 82 to have a negative polarity. These two opposite polarity signals are compared in comparison circuit means 41, shown as comprising a summing resistance 95 with the signals to be compared connected to the opposite terminals thereof. For example, summing resistance 95 has a first portion 96 and a second portion 97 so proportioned that the voltage at the junction 98 therebetween is proportional to the velocity error. In a particular application, to account for different scale factors, resistance portion 96 was provided about 1.5 times the value of resistance portion 97. From the foregoing, it can be seen that the error signal will have a negative polarity when the permissible vehicle velocity signal is greater than the actual vehicle velocity signal and a positive polarity when the permissible vehicle velocity signal is less than the actual velocity.

This negative error signal is converted to an A-C signal the amplitude of which is proportional to the magnitude of the negative error signal, less a very small offset, by applying it to D-C chopper circuit 43. Chopper circuit 43 is provided in a "fail-safe" arrangement shown as including a suitable chopping transistor device 100 having an emitter electrode 101, a collector electrode 102 and a base electrode 103. As shown, transistor chopper circuit 43 is arranged to chop only negative signals thereby giving a zero A-C output for positive signals. This is accomplished as illustrated by connecting the junction 98, which is the output of comparison circuit means 41, to the collector electrode 102 of the transistor device 100. The base electrode 103 is connected through a suitable resistance 105 to a source of negative potential and also through a capacitance 106 to ground. Emitter electrode 101 is connected through the secondary winding 107 of a coupling transformer 108 to ground. A suitable A-C reference or "chopping" signal is applied to the primary winding 110 and coupled to the emitter electrode 101 through secondary winding 107 of transformer 108. The chopper drive voltage at the emitter of chopper transistor 100 is arranged to be small enough in magnitude so that any chopper failure, as for example a collector-emitter short circuit, will result in an A-C output voltage that is small enough to assure that braking effort will be applied to the vehicle.

To prevent overriding the system for very large magnitude negative error signals, such as might occur during operation, means are provided to limit the magnitude of the negative error signal applied to chopper circuit 43. In the arrangement shown, this is provided by a breakdown diode device 120 connected between junction 98 of summing resistance 95 and ground. The maximum negative error signal level, therefore, will be determined by the breakdown voltage of breakdown diode device 120. Since breakdown diode device 120 provides a low impedance path for positive error signals, the maximum magnitude of the positive voltage applied to collector electrode 102 is determined by the small junction voltage drop of diode device 120.

When the voltage at junction 98 is negative the operation of chopper circuit 43 is basically one of shorting the junction 98 to ground each half cycle of the A-C reference signal. That is, each time base electrode 103 is negative with respect to emitter electrode 101 transistor device 100 is conductive and the junction 98 is brought to substantially ground potential, since the A-C voltage drop across secondary winding 107 is small. Thus, as long as the voltage at junction 98 is negative, transistor device 100 "chops" to convert the negative D-C voltage signal at its collector electrode to a synchronous A-C voltage whose magnitude is determined by the magnitude of the D-C voltage signal and whose frequency is determined by the frequency of the A-C chopping signal.

For example, on one half cycle of the A-C chopping voltage when emitter electrode 101 is made positive with respect to the base electrode 103, transistor device 100 behaves like a closed switch and junction 98 is brought to substantially ground potential. On the other half cycle of the reference signal the emitter is made negative with respect to the base and transistor 100 behaves like an open switch. Resistance 105 and capacitance 106 stabilize the base voltage so that current changes due to temperature are avoided. For example, the slow changes in the base to emitter drop caused by temperature changes are prevented from causing a current change since the high value of resistance 105 appears as a stable current source. Thus, even the slightest change in current will cause a voltage drop of a polarity to oppose such change. Capacitance 106 holds the voltage at the base constant for the rapid changes in voltage at the emitter due to the A-C chopping signal. That is, without capacitance 106 the voltage at the base would merely follow the emitter, with no change in collector to emitter condition.

As soon as the junction 98 goes positive, however, the collector-base junction becomes forward biased and the transistor inverts. The A-C chopping signal is now driving into what functions as a collector. As a result there is essentially no coupling of this signal so that the error signal remains at its positive level for both half cycles of the chopping signal. Although a D-C voltage appears at the error junction, an A-C signal is required to produce an output.

The A-C signal from chopper 43 is suitably amplified in amplifier 130 and applied as one input to the permissive gate circuit 44. Permissive gate circuit 44 is arranged to receive a D-C voltage signal from minimum signal selector 45, representing a tractive effort command signal, and the A-C signal derived from the ranging system control loop just described, and designated generally at 132, to produce an A-C output signal whose amplitude is equal to the lesser amplitude of the input signals. This A-C output signal may then be utilized, such as by a suitable traction control means 46, to control the propulsion or braking effort applied to the vehicle.

As shown, permissive gate circuit means 44 is of the type disclosed in the foregoing referenced application of G. J. Michon, Ser. No. 619,672 and includes a diode bridge 134 having diode devices 135, 136, 137 and 138.

The A-C signal from the ranging system control loop 132 is coupled to the diode bridge 134 through a suitable coupling transformer 140 having a primary winding 141 and a secondary winding 142. Primary winding 141 of transformer 140 is connected to the output of amplifier 130 and the secondary winding 142 is connected through resistances 144 and 145 to the terminals 147 and 148 of diode bridge 134. The D-C tractive effort command signals from signal sources 29 are applied ot the input of minimum signal level selector 45 and the output thereof is applied to the terminal 150 of diode bridge 134; the A-C control signal being extracted at the terminal 152. Permissive gate circuit 44 is arranged to operate on D-C signals from source 29 which vary between preselected maximum positive and negative values. In a particular application, for example, the permissive gate signal was arranged to operate on a ±11 volt D-C signal from source 29. In such an arrangement gate circuit 44 was biased accordingly; this bias being conveniently provided by connecting a suitable resistance 154 between the terminal 152 of diode bridge 134 and a suitable source of negative potential. That is, for the particular arrangement referred to, a negative potential of 11 volts is applied to one terminal of resistance 154.

As indicated, permission gate circuit means 44 operates with one D-C input signal applied at the terminal 150 of diode bridge 134 and one A-C signal applied across the terminals 147 and 148 thereof and with either the D-C signal or the A-C signal determining the amplitude of the A-C output.

In operation, assume initially that the amplitude of the D-C signal applied at the terminal 150 of diode bridge 134 is less than that of the A-C signal applied across the terminals 147 and 148. In such a case, the A-C signal is operative to "chop" the D-C input signal. For example, during the A-C half cycle when the terminal 147 is positive with respect to the terminal 148, current flows through diode bridge 134 switching all diode devices thereof to their conductive states. Since all diode devices 135–138 have approximately equal conductive voltage drops, the A-C output voltage is essentially equal to the D-C input voltage. This condition will prevail as long as the current through the loop including resistances 144 and 145 exceeds the current from the input voltage through the diode bridge 134 and bias resistance 154. During the half cycle when the terminal 147 is negative with respect to the terminal 148, all diode devices 135–138 are reverse biased and essentially no current flows through resistances 144, 145 and 154. In such case the A-C output voltage is equal to the bias voltage which, for the particular arrangement referred to, would be, of course, —11 volts.

When the A-C input voltage is smaller than the D-C input voltage, the amplitude of the A-C output signal is equal to that of the A-C input signal. During the half cycle when terminal 147 is positive with respect to terminal 148, diode devices 136 and 137 are switched into conduction, while diode devices 135 and 138 remain reverse biased. The current through resistance 154 is then equal to the D-C input voltage plus the output across terminals 147 and 148 divided by the sum of resistances 144, 145 and 154. By making resistance 154 equal to the sum of resistances 144 and 145 (i.e. $R_{154}=R_{144}+R_{145}$) the A-C output voltage is essentially equal to the D-C input voltage plus one-half the voltage across terminals 147 and 148.

During the A-C half cycle when terminal 147 is negative with respect to terminal 148, diode devices 136 and 137 remain conductive and diode devices 135 and 138 are reverse biased so that an output voltage results which is equal to the D-C input voltage minus one-half the output across the terminals 147 and 148. By using a 1 to 2 step-up transformer to couple the A-C input signal to the diode bridge 134, the amplitude of the A-C output signal taken from terminal 152 will equal the lesser of either the D-C or A-C input signal.

As described in the foregoing referenced Allen and

Litchtenfels application, Ser. No. 418,132, fail-safe operation is provided by arranging the system so that a zero control signal calls for full vehicle brake with the presence of a control signal of some finite magnitude being required to schedule anything less than full brake.

The present system has a similar fail-safe mode of operation. To this end, the ranging system control loop 132 has no bias so that a zero A-C output signal therefrom calls for full brake with a negative error signal from comparison circuit means 41 being required to generate an A-C output signal. Accordingly, from the foregoing description of the system it is evident that that allowable vehicle velocity must be greater than the actual velocity to call for anything less than full brake. Moreover, zero bias in the ranging system control loop 132 together with the utilization of A-C signals provides that failure in the loop will call for full brake and therefore fail-safe operation. In a particular arrangement wherein the loop gain is about 0.5 mile per hour per second per mile per hour, the allowable vehicle velocity must exceed the actual vehicle velocity by 7 miles per hour to reach the COAST mode of operation, and by 14 miles per hour to reach full propulsion. In that particular arrangement full brake represented a negative tractive effort of 3.5 miles per hour per second (−3.5 m.p.h.p.s.) and full propulsion represented a positive tractive effort of 3.5 miles per hour per second (+3.5 m.p.h.p.s.).

While only certain preferred features of the invention have been shown by way of illustration, many changes and modifications will occur to those skilled in the art. It is to be understood, therefore that the appended claims are intended to cover all such changes and modifications as fall within the true spirit and scope of the invention.

What we claim as new and desire to secure by Letters Patent of the United States is:

1. In a system for automatically controlling the operation of a vehicle in accordance with a tractive effort control signal representing the most restrictive mode of operation called for by (1) a number of first electrical signals derived from wayside electrical command signals representing operating data such as permissible maximum local route speed limits or distance to a required stopping point and (2) a second electrical signal representing the range from said vehicle to an obstruction in advance thereof, the combination comprising:
   (a) function generator means responsive to said second electrical signal for producing a first velocity signal whose value is proportional to a preselected maximum vehicle velocity for the range;
   (b) velocity sensing means for producing a second velocity signal whose value is proportional to the actual velocity of the vehicle;
   (c) comparison circuit means responsive to said first and second velocity signals operative to produce a velocity-error signal whose value varies as a function of the difference in value between said first and second velocity signals, said velocity-error signal having a first portion representing an actual vehicle speed greater than the preselected maximum permissible velocity for the range and a second portion representing an actual vehicle velocity less than the preselected maximum permissible velocity for the range;
   (d) circuit means operative to convert only the first portion of said velocity-error signal to an alternating current signal having an amplitude determined by the amplitude of said first portion;
   (e) minimum quantity selector means having input means and output means and being operative to produce a unidirectional voltage output signal representing the smallest of the electrical quantities applied to the input means therof;
   (f) means for applying all of said first electrical signals to the input means of said minimum quantity selector means;
   (g) gate circuit means having first and second input means and an output means and being operative to produce from a unidirectional voltage signal and an alternating current signal applied respectively to the first and second input means thereof an alternating current output signal whose amplitude is determined by the input signal having the smallest value;
   (h) means applying the unidirectional output signal from said minimum quantity selector means to the first input means of said gate circuit means;
   (i) means applying the alternating current signal obtained from the first portion of said velocity error signal to the second input means of said gate circuit means; and
   (j) means for extracting at the output means of said gate circuit means an alternating current control signal whose amplitude is determined by the lesser amplitude of the electrical signals applied at the first and second input means thereof.

2. The system of claim 1 wherein said circuit means operative ot convert only said first portion of said velocity-error signal to an alternating current signal having an amplitude determined by the amplitude of said first portion in a chopper circuit.

3. The system of claim 2 wherein said chopper circuit includes a transistor device having an emitter electrode, a collector electrode and a base electrode.

4. The system of claim 3 wherein the velocity-error signal from said comparison circuit means is applied to the collector electrode of said transistor device.

5. In a system for controlling the operation of a vehicle in accordance with (1) speed control information received on board said vehicle from wayside and (2) range information indicative of the distance between said vehicle and an obstruction in advance thereof, the combination comprising:
   (a) means on board said vehicle responsive to said received speed control information for deriving a number of first unidirectional voltage tractive effort signals whose magnitudes are indicative of the degree of tractive effort to be applied to the vehicle;
   (b) function generator means responsive to said range information for producing a second unidirectional voltage signal whose magnitude is indicative of a preselected maximum permissible vehicle velocity consistant with said range information;
   (c) speed sensing means for producing a unidirectional voltage signal whose magnitude is indicative of the actual velocity of said vehicle;
   (d) comparison circuit means responsive to the second unidirectional voltage signal indicative of permissible maximum vehicle velocity and the unidirectional voltage signal whose magnitude is indicative of the actual velocity of said vehicle for producing a velocity error signal which varies as a function of the difference in magnitude between said unidirectional voltage signals;
   (e) means for converting that portion of said velocity error signal representing an actual vehicle velocity greater than the maximum permissible vehicle velocity consistant with the range information to an alternating current signal whose amplitude is determined by the amplitude of said velocity error signal;
   (f) means for selecting from said first unidirectional voltage tractive effort signals the one having the smallest magnitude;
   (g) gate circuit means having first and second input means and an output means and being operative to produce from a unidirectional voltage signal and an alternating current signal applied respectively to said first and second input means an alternating current output signal whose amplitude is determined by the input signal having the smaller amplitude;
   (h) means applying said smallest of said first unidirectional voltage signals to said first input means of said gate circuit means;

(i) means applying the alternating current signal derived from said velocity error signal to the second input means of said gate circiut means;

(j) means for extracting at the output means of said gate circuit means an alternating current output signal whose amplitude is determined by the smaller of the signals applied at said first and second input means; and (k) means adapted to apply said alternating current output signal to a tractive effort control means to cause the tractive effort applied to said vehicle to be varied in accordance therewith.

6. The system of claim 5 wherein said function generator means includes a linear transformer means and a saturable core transformer means arranged to produce an output voltage which is the sum of the output voltages of said linear transformer means and said saturable core transformer means.

7. The system of claim 6 wherein the means for converting the velocity error signal indicative of an actual vehicle velocity greater than the maximm permissible vehicle velocity for the range in a direct current chopper circuit including a transistor device having an emitter, a collector and a base electrode and being arranged to chop only the polarity of said velocity error signal representing an actual vehicle speed greater than said maximum permissible velocity for the range.

8. The system of claim 7 wherein the drive voltage for said chopper circuit is applied between the emitter and base electrodes of said transistor device and is selected of a magnitude small enough so that any failure of said chopper circuit results in an alternating current voltage output therefrom which is below a level operative to cause a release of braking effort for said vehicle.

References Cited

UNITED STATES PATENTS

| | | | |
|---|---|---|---|
| 2,702,342 | 2/1955 | Korman | 246—30 |
| 3,270,199 | 8/1966 | Smith | 246—182 |
| 3,305,682 | 2/1967 | Bolsted et al. | 246—167 |
| 3,312,818 | 4/1967 | Stapues | 246—187 |
| 3,334,224 | 8/1967 | Allen et al. | 246—182 XR |
| 3,340,951 | 9/1967 | Vitt | 246—182 XR |
| 3,353,019 | 11/1967 | Allen | 246—187 |

FOREIGN PATENTS 1,378,440  10/1964  France.

ARTHUR L. LA POINT, *Primary Examiner.*

STANLEY T. KRAWCZEWICZ, *Assistant Examiner.*